April 17, 1934.　　　　G. F. McCLAY　　　　1,955,007

VALVE ASSEMBLY

Filed Aug. 11, 1932

INVENTOR.
Gordon F. McClay.
BY
HIS ATTORNEY

Patented Apr. 17, 1934

1,955,007

UNITED STATES PATENT OFFICE 1,955,007

VALVE ASSEMBLY

Gordon F. McClay, Sherbrooke, Quebec, Canada, assignor to Ingersoll-Rand Company, Jersey City, N. J., a corporation of New Jersey Application August 11, 1932, Serial No. 628,288

5 Claims. (Cl. 277—60)

This invention relates to valves, but more particularly to valves adapted to control the admission of fluid to or the exhaust of fluid from a compressor, depending upon whether the valve serves as an inlet or a discharge valve.

A few of the objects of the invention are to provide a valve assembly which may be conveniently and expeditiously installed in the compressor, to prevent localized wear of the valve plates which control the flow of fluid through the valve assembly, and to effectively cushion the lift of the valve plates, thereby preventing sharp impact of the valve plates against the elements serving as stops therefor.

Other objects will be in part obvious and in part pointed out hereinafter.

Figure 1:
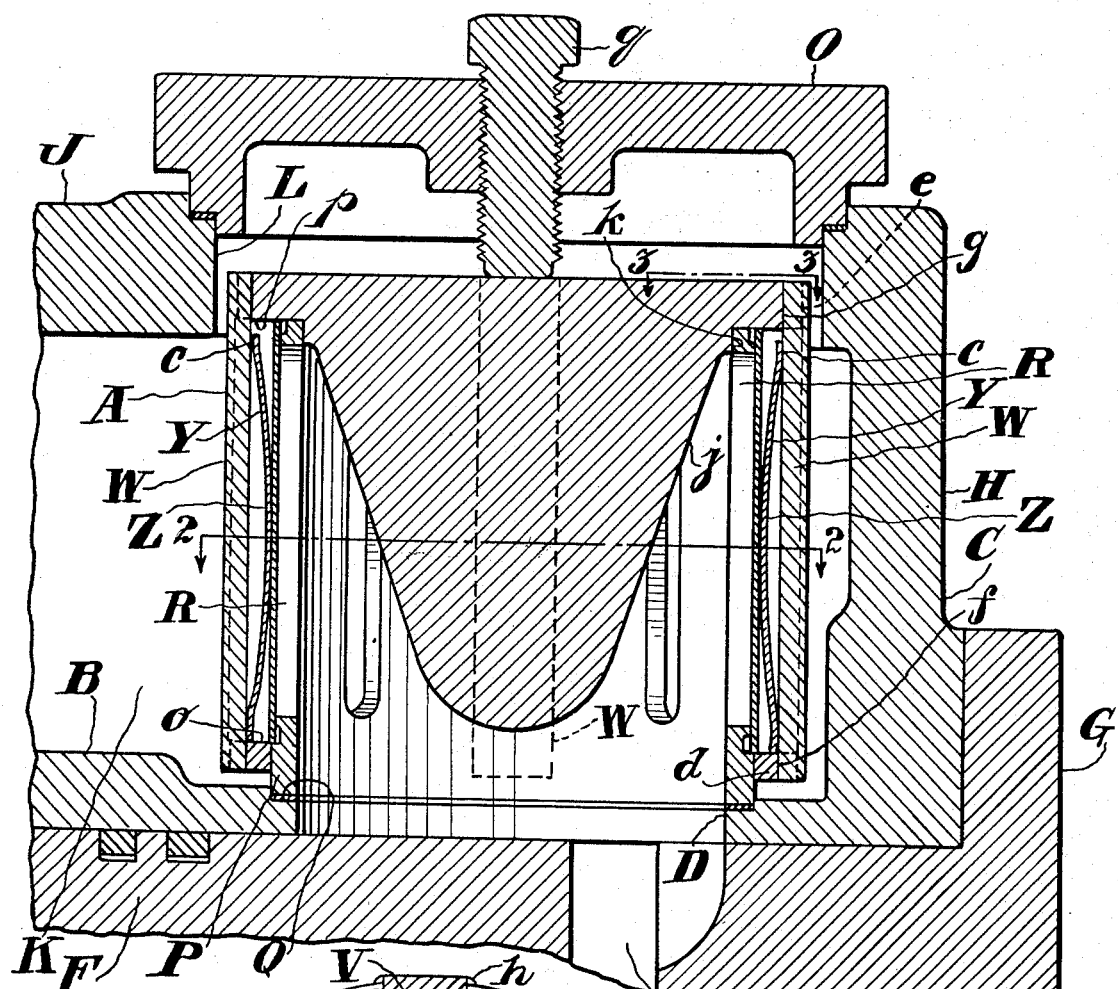
Figures 2, 3:
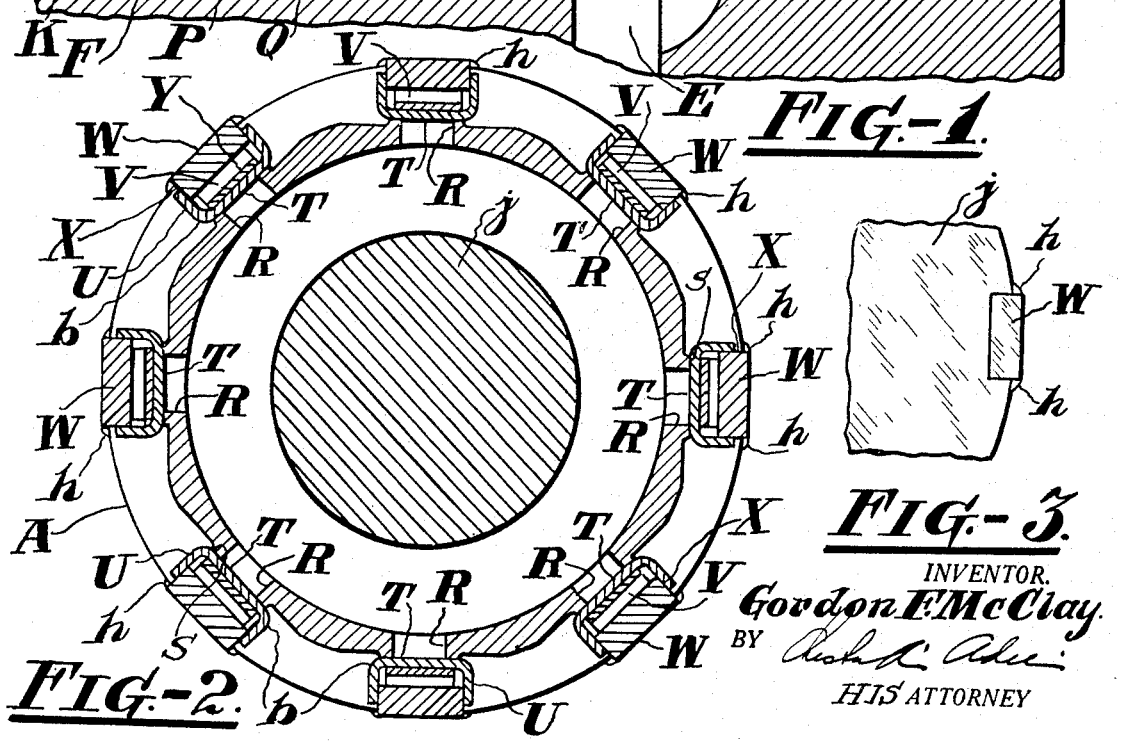

In the drawing accompanying this specification and in which similar reference characters refer to similar parts, Figure 1 is a sectional elevation of a valve constructed in accordance with the practice of the invention and a portion of a compressor wherein the valve is arranged, Figure 2 is a transverse view taken on the line 2—2 of Figure 1, looking in the direction indicated by the arrows, and Figure 3 is a plan view of a detail taken on the line 3—3 of Figure 1, looking in the direction indicated by the arrows.

Referring more particularly to the drawing, the valve assembly, designated in general by A, is shown arranged in an inner wall B of a compressor C to control the flow of fluid through an aperture D in the wall B and which affords communication between the valve assembly and a compressing chamber E of the compressor C.

Within the compression chamber E is a piston F for compressing the working substance, and a closure is provided for the compression chamber E by a head G which may be secured to the cylinder H of the compressor in any well known manner.

In the form of the compressor illustrated the cylinder H comprises an outer wall J which is spaced with respect to the wall B to form therebetween a passage K through which fluid may flow to or from the valve assembly A. In the wall J is an opening L through which the valve assembly A may be inserted into the compressor and said opening L is normally closed by a cover plate O.

The valve assembly A constructed in accordance with the practice of the invention, and which is shown as a discharge valve, comprises a cylindrical valve cage or seat P which seats with its inner end against a shoulder Q encircling the aperture D. In the valve seat P are a plurality of longitudinally extending ports R arranged in radial fashion and through which the fluid compressed by the piston F flows. Encircling the ports R, which are of oblong shape, are raised seating surfaces S for valves T whereby the ports R are controlled.

The valves T are in the form of straight narrow plates having lateral flanges or wings U along their longitudinal edges and said wings lie on the same side of the valve plates to form therebetween channels V into which extend guide members W wherewith the wings U are in slidable engagement to prevent the valves plates T from tilting with respect to the seating surfaces S. The inner surfaces of the wings U bear against the sides or edges X of the guide members W for this purpose, and between these surfaces may exist sufficient clearance to permit a restricted flow of pressure fluid into and from the channels V for cushioning the lift of the valve plates T.

The points $b$ at which the wings U are joined to the valve plates T are suitably curved in order to minimize resistance to the fluid flowing around the valve plates to or from the ports R.

In order to effect a prompt seating of the valve plates T and to hold said valve plates in fluid tight relationship with the seating surfaces S, springs Y are disposed in the channels V to act against the valve plates T and the guide members W. The springs Y selected for this purpose are of the curved leaf type and are preferably so arranged that the bowed intermediate part Z seats against the valve plate T and the ends of tips $c$ of the springs seat against the guide members W.

The means whereby the guide members W are supported consists, in the present instance, of a pair of flanges $d$ and $e$ disposed adjacent the inner and outer ends respectively of the valve seat P. The flange $d$ is disposed slidably on the valve seat P and is provided in its periphery with notches $f$ to accommodate the ends of the guide members W. In like manner, the outer ends of the guide members W are disposed in notches $g$ in the periphery of the flange $e$ and the guide members may be secured to the flanges $d$ and $e$ as by welding, as indicated at $h$.

Preferably the flange $e$ forms an integral part of a plug $j$ which extends into the interior of the valve seat P and serves as a filler piece for minimizing the clearance within the valve cage. At the juncture of the plug $j$ and the flange $e$ is a cylindrical surface $k$ which extends slidably into the end of the valve seat P to hold the valve seat and the flange $e$ in concentric relationship. In the form of the invention illustrated the inner surfaces $o$ and $p$ of the flanges $d$ and $e$, respectively, engage and serve as guiding surfaces for the ends of the valve plates T and also as closures for the open ends of the channels V.

To the end that the various elements, such as the valve cage P, the plug $j$ and the members connected thereto may be conveniently held in their respective assembled positions and that the entire assembly may be held fixedly in the wall B of the compressor, the cover O is provided with a set screw $q$ threaded thereinto and seating against the outer end of the plug $j$.

During the normal operation of the compressor the air or other gaseous medium compressed by the piston F passes into the valve seat P and lifts the valve plates T thence flows into the passage K. At the beginning of the subsequent suction stroke of the piston F the valves T are returned to their seats by the springs Y and will seat uniformly at all points upon the seating surface S since, as may be readily observed, they are adequately guided by the guide members W against which the inner surfaces of the wings U seat.

Owing to the provision of a suitable degree of clearance between the wings U and the adjacent surfaces of the guide members pressure fluid of the same value as that in the passage K will exist in the channels V. During the compression stroke of the piston F pressure fluid within the channels V will be discharged therefrom through the restricted spaces between the guide members and the wings U and the valve plates T will be unseated without impacting sharply against the guide members W.

I claim:

1. A valve assembly comprising a valve seat having a port, a valve to control the port and having a channel, flanges at the ends of the port to serve as closures for the ends of the channel, a guide member in the channel to guide said valve, and a spring in the valve seating against the guide member to press the valve against the valve seat.

2. A valve assembly comprising a valve seat having a port, a valve to control the port and having a channel, flanges at the ends of the port having guiding surfaces for the ends of the valve and serving as closures for the ends of the valve, a guide member supported by the flanges and extending into the channel to guide said valve, and a spring encased by the valve and the guide member and acting against both to press the valve against the valve seat.

3. A valve assembly comprising a valve seat having a port, a valve plate to control the port and having a pair of wings to form a channel on one side of the valve, means adjacent the ends of the port having guiding surfaces engaging the ends of the valve plate to serve as closures for the ends of the channel, a guide member for the wings and extending into the channel, and a spring in the channel acting against the valve plate and the guide member to press the valve plate against the valve seat.

4. A valve assembly comprising a cylindrical valve seat having a plurality of ports extending longitudinally thereof, valve plates to control the ports and having wings to form a channel on one side of each valve plate, flanges to guide the ends of the valve plates and to act as closures for the ends of the channels, guide members supported by the flanges and extending into the channels to act as guides for the wings, and springs in the channels acting against the valve plates and the guide members to press the valve plates against the valve seat.

5. A valve assembly comprising a cylindrical valve seat having a plurality of ports extending longitudinally thereof, flanges at the opposite ends of the valve seat and being in slidable engagement therewith, valve plates to control the ports and being held against endwise movement by the flanges, wings on the valve plates forming channels on one side of the valve plates, guide members connecting the flanges and extending into the channels to guide the valve plates and to control the passage of cushioning fluid into and from the channels, and springs in the channels acting against the valve plates and the guide members to press the valve plates against the valve seat.

GORDON F. McCLAY.